Feb. 18, 1930.  E. E. WHITE  1,747,205
LOCKING MEANS FOR RECEPTACLE CLOSURES
Filed Sept. 13, 1928
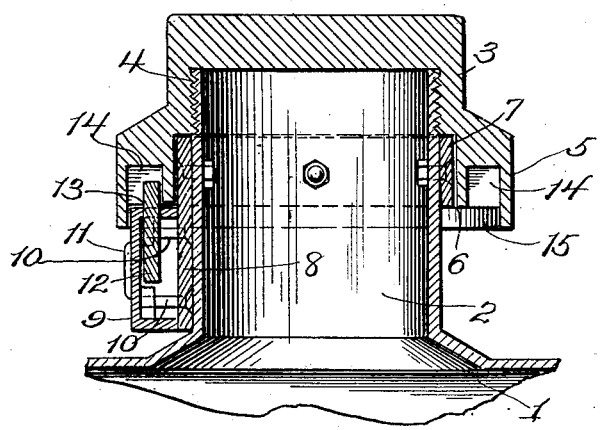
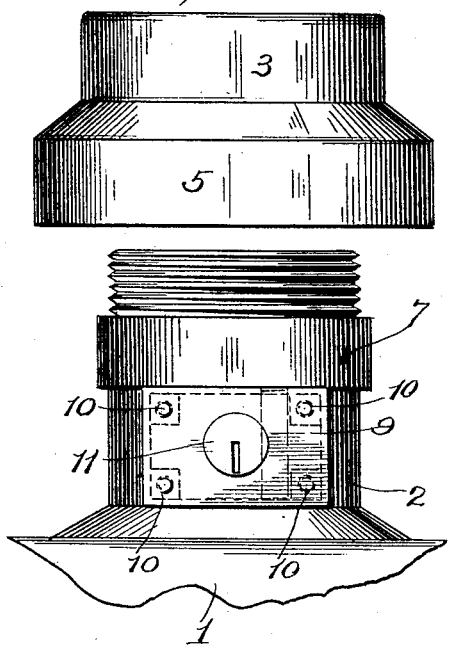
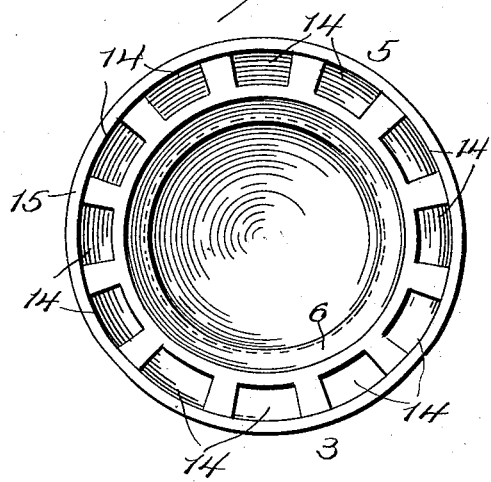
Inventor
E. E. White
By Seymour & Bright
Attorneys Patented Feb. 18, 1930

1,747,205

UNITED STATES PATENT OFFICE

EDWIN ELLIS WHITE, OF PAINTSVILLE, KENTUCKY

LOCKING MEANS FOR RECEPTACLE CLOSURES

Application filed September 13, 1928. Serial No. 305,711.

This invention has for its object the provision of simple and efficient means for preventing removal of a container closure and may be used wherever it is desired to guard the contents of a receptacle against theft, although it is designed primarily for application to the fuel tanks of motor vehicles. The invention is illustrated in the accompanying drawing and will be hereinafter fully set forth and particularly defined.

In the drawings:

Figure 1 is a vertical section showing the invention applied;

Figure 2 is an elevation, the filler tube and cap being separated;

Figure 3 is a bottom plan view of the cap.

A portion of a tank is shown at 1, said tank having a filler tube 2 which is normally closed by a cap 3.

The cap has a threaded connection with the filler tube, as shown at 4, and below its threaded bore is expanded to form a rim 5 having a smooth-walled annular channel 6 in its inner circumference. A supporting ring or band 7 is secured around the tube in position to be housed in the channel 6, as shown in Figure 1, and this band is formed with a pendent extension or plate 8 upon which is secured a lock casing 9 by screws 10 inserted from the inner side of the plate before the plate and band are secured upon the tube. The casing 9 contains a lock 11 having a vertically moving bolt 12 which, in active position, projects through an opening 13 in the top of the casing to enter one of a series of notches 14 in the under side of the rim 5 as shown and as will be understood. It will be noted that the rim has an annular depending flange 15 which passes over the top of the lock casing and the bolt to prevent access thereto with a prying tool.

It will be understood that the cap is rotated to effect upward or downward movement upon the filler tube and that, as it moves downward, one of the notches 14 will be located over the bolt 12 whereupon if the bolt be projected the rotation of the cap will be prevented. The cap cannot then be withdrawn from the tube until the bolt is retracted.

Having fully described my invention what I claim as new and desire to secure by Letters Patent, is:—

The combination with a filler tube, of a cap threaded onto the tube and having an expanded rim at its lower end, said rim having a series of notches in its under side and a channel in its inner circumference, a band secured around the tube in position to fit within said channel and having pendent extension, and a lock carried by said extension and having an upwardly projected bolt engageable in any one of the notches in the rim.

In testimony whereof, I have signed this specification.

EDWIN ELLIS WHITE.